UNITED STATES PATENT OFFICE.

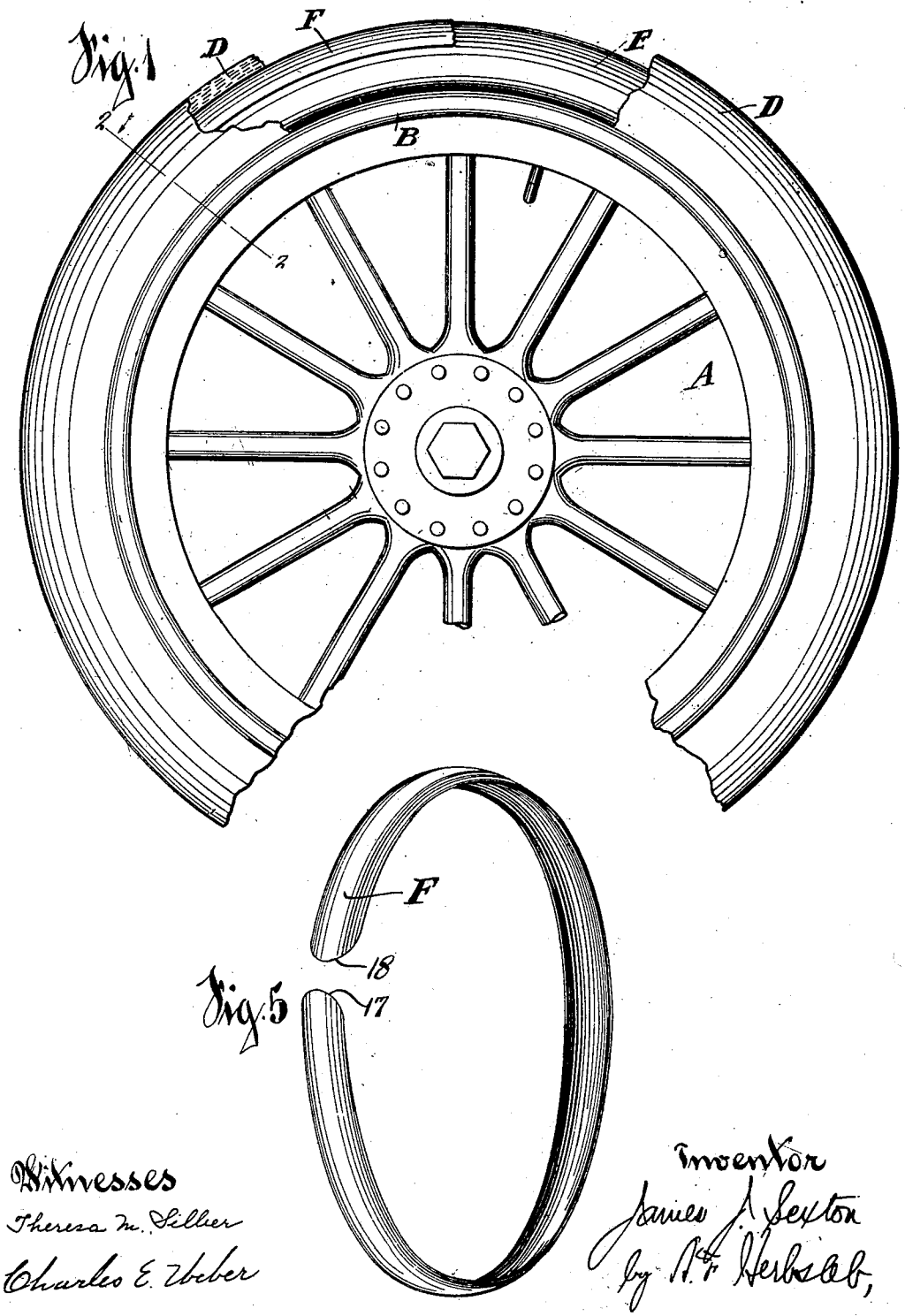

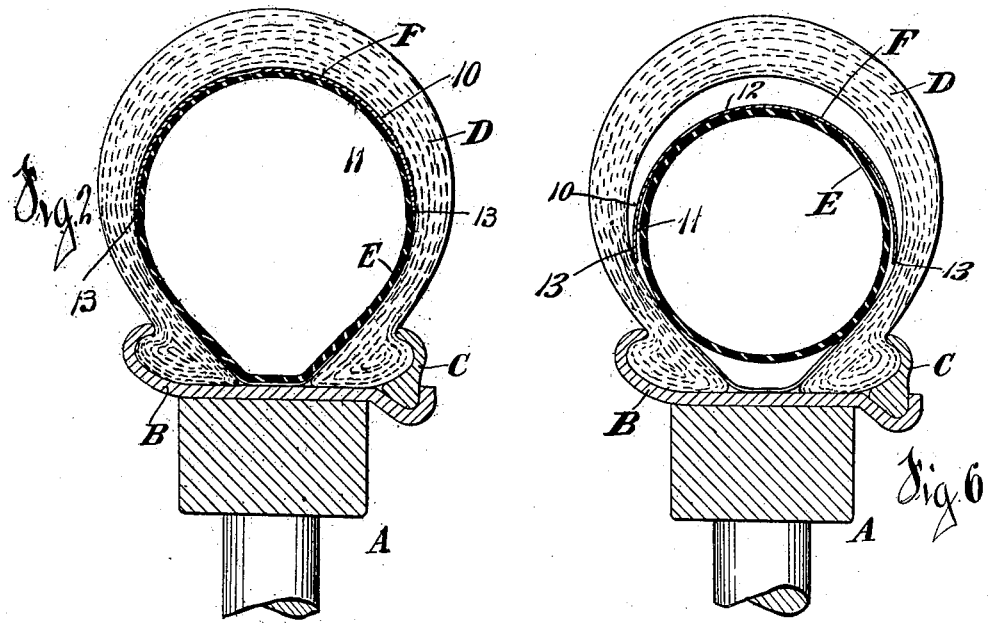
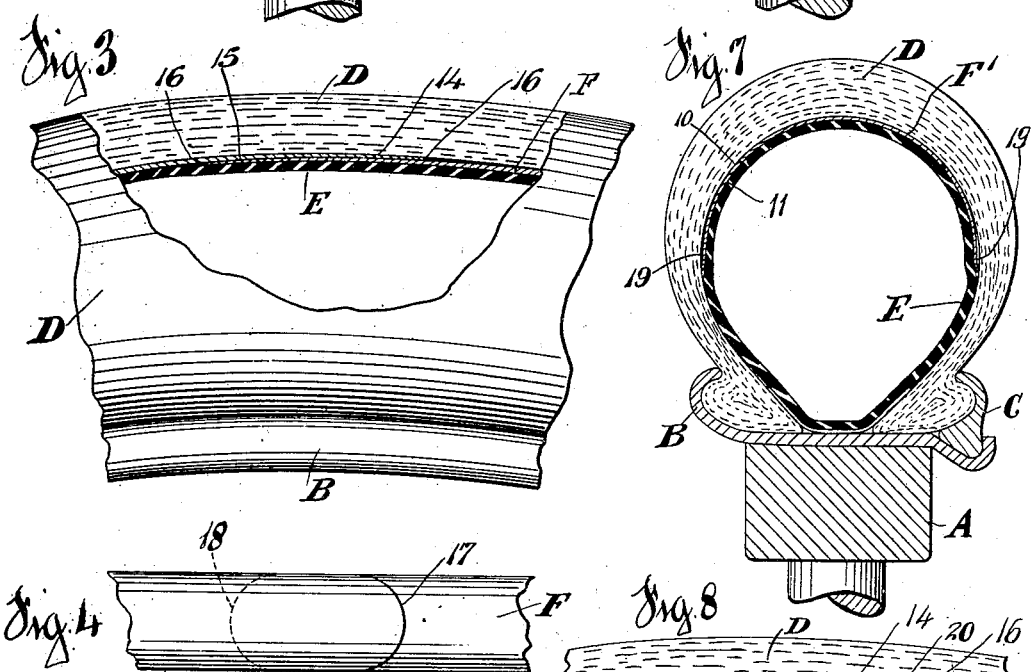
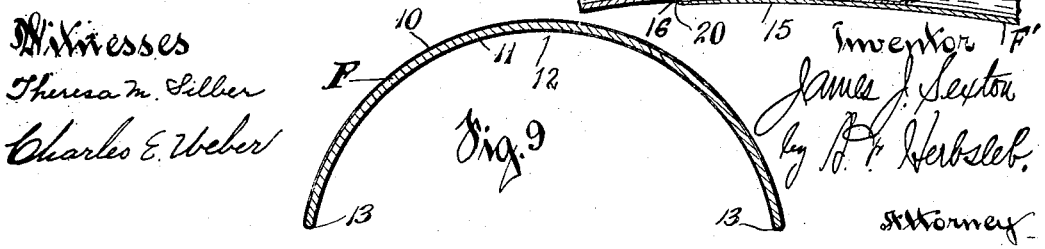

JAMES J. SEXTON, OF COLUMBUS, OHIO.

PNEUMATIC TIRE.

1,266,064.

Specification of Letters Patent.

Patented May 14, 1918.

Application filed August 31, 1914. Serial No. 859,380.

*To all whom it may concern:*

Be it known that I, JAMES J. SEXTON, a citizen of the United States, residing at Columbus, in the county of Franklin and State of Ohio, have invented certain new and useful Improvements in Pneumatic Tires, of which the following is a specification.

It is the object of my invention to provide protecting means in a pneumatic tire whereby punctures and blow-outs are prevented, and the invention consists in providing a non-friction inner lining of compressed fibrous material between the outer casing or shoe of the tire and the inner pneumatic tube thereof, so arranged that a puncture-resisting flexible layer is interposed between said outer casing and pneumatic tube at the tread portions and to the sides of the tread portions thereof, acting to sustain the pressure of the inner pneumatic tube at each point of contact of said tube with said lining over a wide area of the fibrous lining, whereby to prevent localizing of the pressure of the inner or pneumatic tube upon a weakened portion of the outer casing or shoe for preventing blow-outs.

The invention will be further readily understood from the following description and claims, and from the drawings, in which latter:

Figure 1 represents a side elevation of a vehicle wheel embodying my invention, partly broken away for better illustration of the parts.

Fig. 2 is a cross-section of the same on the line 2—2 of Fig. 1.

Fig. 3 is a central vertical section taken at the point of junction of the ends of the protective lining and showing part of the wheel in side elevation.

Fig. 4 is an edge elevation showing the roundings at the ends of the lining.

Fig. 5 is a perspective view of the lining.

Fig. 6 is a cross-section on the line 2—2 of Fig. 1, showing the parts with the inner tube in unflated condition for showing the normal relative curvatures of the parts.

Fig. 7 is a cross-section of a modification of my improved device, showing the outwardly bent side edges of the lining.

Fig. 8 is a central vertical section of said modification, showing the outwardly bent ends of the lining, and, Fig. 9 is an enlarged cross-section of the lining A represents the body of a usual vehicle wheel, such as an automobile wheel, about which there is an ordinary rim-band B and a locking-ring C, of usual construction, for holding the pneumatic tire in place, or these parts may assume any other usual or desirable form or have any other usual or desirable fastening means substituted therefor.

D represents the outer casing or shoe of an ordinary pneumatic tire, the inner pneumatic tube being shown at E. This casing and tube may be of ordinary or usual construction.

F is a lining which is interposed between the outer annular portions of the inner pneumatic tube and the outer casing. This lining is of a compressed fibrous material provided with anti-friction surfaces 10, 11. These surfaces may, in practice, be formed by calendering said surfaces or by means of an anti-friction coating which becomes a part of the lining.

The lining is formed in cross-sectional curved form, as shown at 12, the curvature being preferably less than the normal cross-curvature of the inner face of the outer casing, as indicated in Fig. 6, so that the side edges 13, 13, of said lining may normally hug the said inner face of said outer casing when the inner tube is expanded, the expansion of the inner tube forcing the tread-portion of said lining firmly against the inner face of the tread-portion of the outer casing.

In order to prevent abrasion of the inner face of the outer tube and the outer face of the inner tube, these side edges are preferably cross-sectionally rounded as shown.

The ends of the lining are formed tapering, as shown at 14, 15, the tapers extending throughout a sufficient portion of the length of the lining to insure lapping of the ends of the lining throughout the various conditions of tension of the inner tube and weight applied upon the axle of the wheel. The ends of the lining, also preferably rounded as shown at 16, 16, are also preferably formed with roundings 17, 18, across the width of said ends.

The lining is preferably a hard fibrous substance, such for instance as hard fiber, of the character of that used to great extent for electrical insulation, so - called leather board, or similar materials, formed with anti-friction surfaces. The lining is a substantially self-sustaining structure but sufficiently pliable and preferably resilient for conforming to the various shapes which the tread portions of the pneumatic tire may assume in use, or when meeting obstructions, the tendency of the edges and ends of the lining being to normally press outwardly, the lining being preferably so formed by molding or by rolling, or other suitable operation for effecting this purpose.

The normal diameter of the lining is preferably larger than the diameter of the annulus of the inner face of the tread-portion of the outer casing, whereby the tendency is for the ends of the lining to press outwardly for relieving contact of the ends with the inner pneumatic tube.

This tendency for outward pressure of the side edges of the lining and the ends of the lining may also be effected by providing said side edges and said ends with slight outward bends, respectively shown at 19, 20, on the modification of the lining F', shown in Figs. 7 and 8.

The lining is provided with anti-friction surfaces for making of it a floating member or lining interposed between the outer face and the inner face respectively of the outer portions of the inner tube and outer casing, so that the lining may yield and circumferentially shift and spread to conform to all conditions imposed upon the structure.

The anti-friction surfaces of the lining also permit ready shifting of the lining throughout its length between the inner tube and outer casing to conform to higher or lower pressures in the pneumatic tube, and to conform to the shifting of parts advisable when the tube strikes a rock or travels over uneven surfaces or in the ordinary compressions of load and traction in the usual running of the automobile or other vehicle to which it is applied.

The lining described, in practice readily yields and conforms to the shapes imposed upon the outer casing in usual travel and road conditions, both circumferentially and transversely and therefore does not detract from the resiliency of the tire. It permits shifting of the lining in accordance with conditions without injury to either the inner tube or outer casing and adapts itself to stress in all directions.

It further avoids puncturing of the pneumatic tube by deflecting the nails, sharp stones, or other puncturing elements which may pierce the casing, and prevents blowouts by providing a hard fibrous lining over weakened portions of the outer casing, thereby distributing the pressure, which would otherwise be localized at the weakened portion of the outer casing, over a greater area of said lining than the area of said weakened portion.

Having thus fully described my invention, what I claim as new and desire to secure by Letters Patent, is:

1. In a pneumatic tire, the combination of an inner pneumatic tube, an outer casing, and a resilient lining of compressed fibrous material of substantially annular form and cross-sectionally curved interposed between said tube and casing, the surface of said lining calendered for constituting said surface an anti-friction surface for providing ready slippage between said lining and tube.

2. In a pneumatic tire, the combination of an inner pneumatic tube, an outer casing, and an annularly arranged floating lining of compressed fibrous material having overlapping tapering ends which are provided with end roundings across their widths, the surfaces of said lining calendered for rendering said surfaces hard anti-friction surfaces, said lining interposed between the outer annular portions of said tube and casing, and said hard calendered anti-friction surfaces providing ready slippage of said lining annularly with relation to said outer annular portions of said tube and casing.

In testimony whereof, I have hereunto signed my name in the presence of two subscribing witnesses.

JAMES J. SEXTON.

Witnesses:
M. T. FLOWERS,
P. C. EVICK.